United States Patent [19]

Eisenmann et al.

[11] Patent Number: 4,823,749
[45] Date of Patent: Apr. 25, 1989

[54] DEVICE FOR CONTROLLING THE INTAKE AIR IN AN INTERNAL COMBUSTION ENGINE

[75] Inventors: Manfred Eisenmann, Wiesentheid; Hans Schreiber, Lappersdorf, both of Fed. Rep. of Germany

[73] Assignee: Siemens Aktiengesellschaft, Berlin and Munich, Fed. Rep. of Germany

[21] Appl. No.: 172,223

[22] Filed: Mar. 23, 1988

[30] Foreign Application Priority Data

Apr. 9, 1987 [DE] Fed. Rep. of Germany ....... 3711972

[51] Int. Cl.$^4$ ............................................. F02D 41/16
[52] U.S. Cl. .................... 123/339; 123/361; 123/399
[58] Field of Search ................ 123/339, 361, 399, 403

[56] References Cited

U.S. PATENT DOCUMENTS 4,237,833 12/1980 Des Lauriers ..................... 123/339
4,432,317 2/1984 Kawamura ......................... 123/339
4,619,237 10/1986 Auslander et al. ................. 123/399
4,660,520 4/1987 Inoue et al. ....................... 123/399

OTHER PUBLICATIONS

"Querschnitt" published by VDO Adolf Schindling AG, Mar., 1981.

Primary Examiner—Andrew M. Dolinar
Attorney, Agent, or Firm—Hill, Van Santen, Steadman & Simpson

[57] ABSTRACT

Device for controlling the intake air in an internal combustion engine. The control occurs via a throttle valve that is adjusted by a stepping motor and is directly secured on the shaft of the stepping motor thereof. The stepping motor is driven in fine step mode in order to be able to position the throttle value with great precision. In order to achieve a high speed of adjustment, a rough step mode is provided, whereby an extremely large, dynamic load angle can be respectively achieved during accelerating and decelerating independently of the operating parameters.

19 Claims, 1 Drawing Sheet

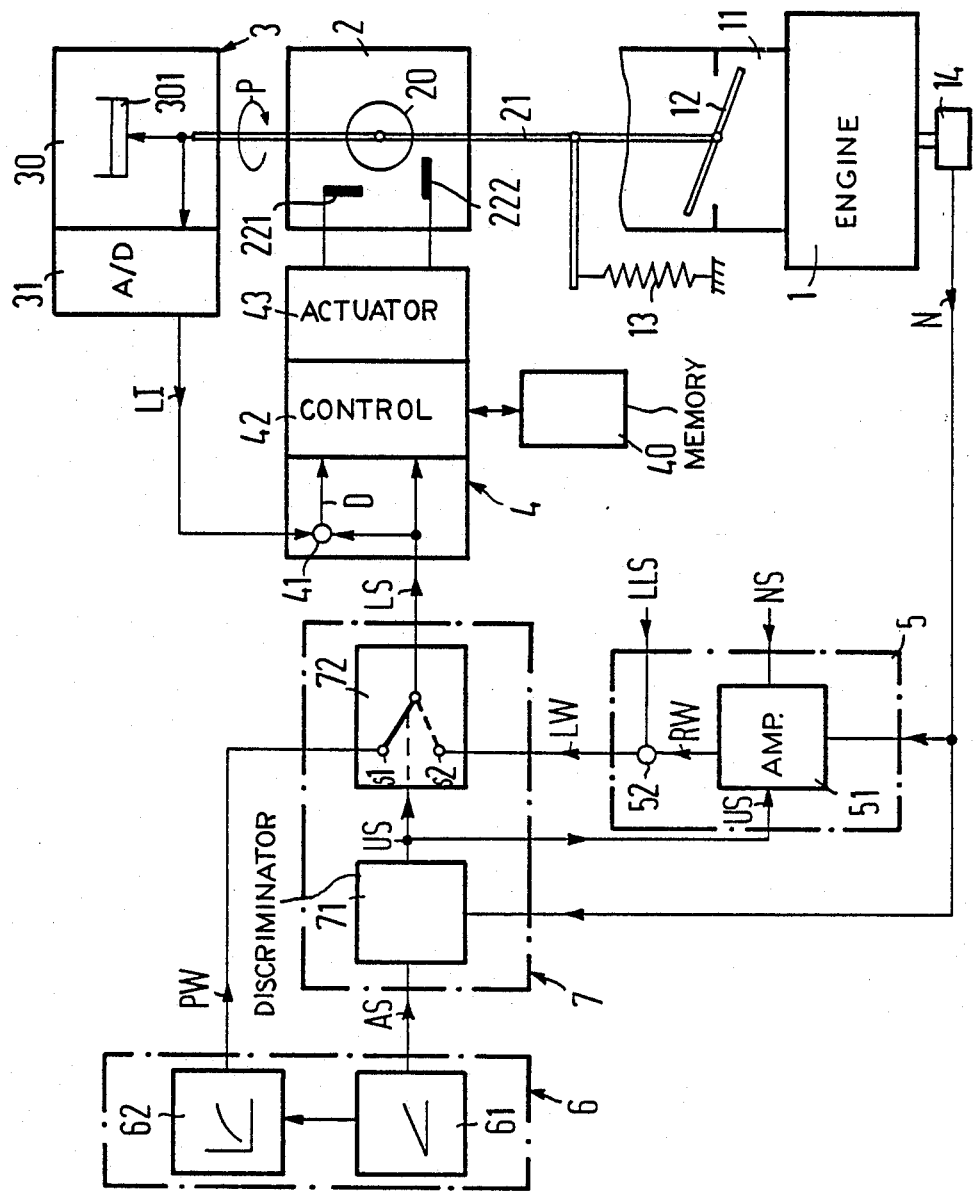

DEVICE FOR CONTROLLING THE INTAKE AIR IN AN INTERNAL COMBUSTION ENGINE

BACKGROUND OF THE INVENTION

The invention is directed to a device for controlling the intake air of an internal combustion engine.

A prior art device is known from the periodical "Querschnitt" (Published by VDO Adolf Schindling AG, March 1981). An additional final control element is provided therein for idle operation in a bypass to the throttle valve that provides fluctuations in the idle speed to be kept within a predetermined range.

SUMMARY OF THE PRESENT INVENTION

An object of the present invention is to provide an improval of a device of the species initially cited which controls the intake air with a single final control element during driving operation, that is high regulating speed, and during idle operation, that is high resolution.

The inventive solution of this object is a throttle valve in combination with a directly coupled stepping motor which controls the intake air during driving operation and during idle operation.

The invention operates without additional gearing. All problems connected with gearing (for example, aging of the lubricant and modification of the motor load dependent thereon; increased mass moment of inertia) are thus eliminated. In addition, a restoring spring can be fashioned significantly weaker than prior art springs, this in turn allowing use of a smaller motor and better dynamic properties.

The stepping motor is controlled in rough step operation and fine step operation. Dependent on the system incorporating the stepping motor, the rough step can be a full step or a partial step; in the present case, a two-phase stepping motor is controlled with a full step width of 1.8° in rough steps of 0.45°, i.e. in quarter steps.

From experimental testing, a positional change of 0.02° in the throttle valve results in a speed modification of about ten revolutions per minute. However, the entire range of adjustment of the throttle valve of about 90° in fine angles of 0.02° cannot be realized with a displacement transducer of reasonable cost. The invention is based on the perception that position feedback can be eliminated in idle operation and a position control circuit can be eliminated since an exact setting of the absolute angular position of the throttle valve is not critical. On the contrary, the speed control requires a setting of the throttle valve such that the idle speed remains within set established limits. To that end, however, the throttle valve must be adjustable in fine steps of 0.02°. This demand can be met by the selection of an appropriate stepping motor as well as by the structure of the speed control and of the setting means for the currents through the excitation windings of the stepping motor.

According to a further development of the invention, the change between control in rough steps and fine steps is dependent on the size of a difference signal at an input of the position control circuit. Since the position control circuit is only closed in rough step mode, one can manage with a displacement transducer whose resolution is equal to the size of a rough step. This can be realized with reasonable outlay: a simple preset potentiometer suffices whose position-dependent analog voltage is converted via an analog-to-digital converter into a digital actual position value having G rough places, whereby G is selected such that the last place, that is the least significant bit (LSB) place, has a change in value during every rough step of the stepping motor. The field vector of the stepping motor is then displaced by a rough step as a result of every such value change. An optimum acceleration or, respectively, deceleration can thereby always be achieved in rough step mode without taking fluctuations of the operating parameters such as supply voltage or load of the stepping motor into consideration. The high rate of adjustment required in driving operation can thus be achieved.

It is advantageous within the framework of the invention to couple the displacement transducer and the stepping motor such that, given a value change of the LSB place of the actual position value, a spacing angle lies between the position of the rotor of the stepping motor and the neighboring lock-in position of a rough step. This spacing angle is expediently selected equal to half of a rough step because identical conditions then result for the acceleration and deceleration mode.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing in which:

The single FIG. is a schematic drawing of the present invention.

DESCRIPTION OF THE PREFERRED EMBODIMENT

As shown in the FIG., a throttle valve 12 is rotatably seated in an intake pipe 11 of an internal combustion engine 1. It is seated directly on a shaft 21 of a rotor 20 of a stepping motor 2. A displacement transducer 3 and a restoring spring 13 are coupled to the shaft 21. The restoring spring 13 turns the throttle valve 12 into a closing position opposite the arrow direction P when the stepping motor 2 does not exert any torque.

The stepping motor 2 is a two-phase stepping motor with stator windings 221, 222. These stator windings 221,222 generate a field vector whose position and size is dependent on the currents through the field windings. The currents are supplied by an actuating means 43 that is part of a positional control 4 and increments the field vector in rough or fine steps.

The displacement transducer 3 is composed of an analog generator 30 and an analog-to-digital converter 31 having G(equals 7) places that are referred to as rough places. The analog generator 30 essentially contains a pre-set potentiometer 301 whose tap is coupled to the shaft 21 of the stepping motor 2 and supplies an analog voltage whose value is dependent on the angular position of the throttle 12. The seven rough places of the analog-to-digital converter 31 yield a resolution of about 90° in sub-angles of 0.45° for the overall range Y of adjustment of the throttle valve, this sub-angle of 0.45° corresponding to a rough step of the stepping motor 2. At every change of the position of the throttle valve by a rough step, a value change occurs in the LSB place of the digital actual position value LI that is supplied from the analog-to-digital converter 31.

The tap of the pre-set potentiometer 301 of the analog generator 30 is coupled to the shaft 21 of the stepping motor 2 such that this value change occurs when the rotor is situated precisely in the middle between the lock-in positions of successive rough steps.

Included in the position controller 4 is an adder element 41 to which the actual position value LI and a rated position LS are supplied and that forms a digital difference signal D from LI and LS. The difference signal D is supplied to a control part 42 of the position controller 4. The control part 42 further receives the rated position value LS and, given every change of the rated position value LS, converts the difference signal D into an optimum step sequence of rough and fine steps and executes this step sequence with the adjustment means 43 until a new step sequence is triggered by a new rated position value LS.

In order to identify every step sequence, the control part 42 utilizes a memory 40 in which the optimum plurality of rough steps during drive mode, of rough steps during braking mode and of remaining fine steps for every rotational direction (in the direction of or opposite to the restoring spring 13) are stored for every difference signal. The structure of the adjustment means 43 for converting the step sequences into currents through the excitation winding 221,222 is part of the prior art (Siemens Components 24, 1986 No. 5, Pages 186–193).

The maximum allowable load angle at which optimum accelerating and decelerating conditions result is 7.5 full steps corresponding to 6 rough steps. In order to provide this condition, the control part 42 initially advances the field vector by 5 rough steps in comparison to the rotor for the execution of a rough step. As soon as the rotor has followed the field vector to such an extent that a value change occurs in the LSB place of the actual position value LI, the field vector is again forwarded by half a rough step via the control part 42 and the adjustment means 43. At this moment, the load angle has the maximally possible value of 6 rough steps. This procedure is repeated until all rough steps in the drive mode have been executed. The load angle thus fluctuates between 5.5 and 6 rough steps at every rough step.

Upon transition from the drive mode into the braking mode, the control part 42 retains the field vector and this is overtaken by the rotor of the stepping motor. As soon as the position thereof lies 7.5 rough steps in front of the stationary field vector, the field vector is again forwarded by a rough step as a result of the value change in the LSB place of the actual position value LI. The field vector now trails the rotor, namely, with a braking angle that fluctuates between 6.5 and 7.5 rough steps.

The rated position value LS is likewise present as a binary number having S places that are subdivided into G rough places and an additional F fine places. The number of fine places is selected such that every rough step can be divided into fine steps of 0.02°.

The rated position value LS is supplied by a control unit 7 that essentially contains a shunt 72 and a discriminator 71 that drives the shunt 72 between two switch positions s1 and s2.

In switch position s1, the shunt through-connects a pedal value PW as rated position value LS. This pedal value PW is supplied by a generator part 6 that is composed of a pedal value generator 61 and of a following performance characteristics memory 62. The performance characteristics memory 62 assigns a defined pedal value PW to every position of the pedal value generator 61. Further, the pedal value generator 61 supplies a stop signal AS when the pedal value generator 61 is situated in quiescent position.

In switch position s2, the shunt 72 through-connects a no-load value LW as rated position value LS that is supplied by a speed regulator 5. This is essentially composed of a controlled-gain amplifier 51 having current control whose input side receives a rated speed value NS for the no-load speed and a speed value N from a speed generator 14 that is proportional to the speed of the internal combustion engine 1. The controlled-gain amplifier 51 integrates the difference of these two input quantities N and NS and supplies a digital regulator value RW corresponding thereto.

An adder element 52 forms the no-load value LW from this regulator value RW and from a rated no-load value LLS. The rated no-load value LLS determines that position of the throttle valve 12 that enables the desired no-load speed under the least favorable conditions. Since this is load-dependent, the rated no-load value LLS is preferably a function of certain parameters (motor load, on-board voltage) that act on the no-load speed at an established position of the throttle valve.

The discriminator 71 in the control unit 7 receives the stop signal AS and the speed value N from the pedal value generator 61. From these, it determines whether driving operation or idling operation is present and supplies a corresponding switch-over signal US with which the shunt 72 is driven into the indicated switch position s1 for driving operation and is driven into the switch position s2 for idling operation. Further, the switch-over signal US is supplied to the controlled-gain amplifier 51 and, at every transition from driving operation to idling operation, effects a brief 0-setting of the integral part of the regulator value RW.

The switch-over signal US can also serve the purpose of storing the actual position value LI at every transition from idling operation into the driving operation and to set it as a rated no-load value LLS.

During driving operation (shunt 72 in switch position s1 as shown), the rated position value LS is equal to the pedal value PW output by the performance characteristics memory 62 and is converted into a corresponding setting of the throttle valve 12 by the position controller 7 in the manner previously set forth. This is also true when the pedal value generator 61 is released, i.e., upon transition into the idling operation. Depedent on the prior position of the throttle valve 12, the difference signal D can thereby have relatively large values, so that the throttle valve is adjusted in rough steps having a speed of 90° per 100 milliseconds toward the no-load position.

As soon as the speed value N has reached an intercept value lying above the desired no-load speed, the discriminator 71 switches the shunt 72 to switch position s2 and sets the integral value of RW to 0. The rated position value LS is therefore initially determined by the rated no-load LLS. Dependent on the size of the difference signal D between this value LLS and the actual position LI, the position regulator 4 operates in rough-step or fine-step mode. Insofar as the speed value N of the internal combustion engine 1 deviates from the rated speed value NS for the idling speed, the controlled-gain amplifier 51 forms a regulator value RW whose amount increases with the difference between N and NS and whose operational sign is dependent on the operational sign of this difference. A no-load value LW results therefrom and, given a great deviation of the speed value N from NS, first serves as rated position value LS for the position control circuit 2, 3 and 4 that adjusts the throttle valve 12 in rough step mode in the direction of the desired speed change. When N and NS have approached one another to such degree that the difference signal D between the no-load value LW and the actual position value LI no longer changes the G rough places, then the position control circuit remains open and the stepping motor 2 is directly controlled in fine step mode with the no-load value LW.

The control part 42 also monitors the functioning ability of the stepping motor and throttle valve. When the rotor does not follow the adjustment of the field vector within a reasonable time, there is an indication of an error. For example, the throttle valve may have seized. In this case, the control part allows the field vector to rotate with a frequency that is close to the resonant frequency of the mechanical system. The vibrating motion caused as a result thereof breaks the throttle valve free.

In order to facilitate an understanding of the invention, the individual function blocks in the exemplary embodiment have been given designations that are standard for hardware modules. However, it will be evident to a person skilled in the art that a large part of these functions can be most simply realized with an appropriately programmed microcomputer. This is particularly true of the function of the position controller 4, of the speed controller 5, of the control unit 7 and of the analog-to-digital converter 31. The essence of the invention, accordingly is not comprised in the hardware structure shown in the FIG., but in the functional interconnection between the output quantity of the analog generator 30, the speed value N, the pedal value PW, the rated no-load value LLS, the rated speed value NS and the stop signal AS on the one hand and the currents through the stator windings 221, 222 of the stepping motor 2 on the other hand.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Device for controlling the intake air of an internal combustion engine,
    having a speed generator that supplies a speed value, N, that is dependent on the speed of the internal combustion engine,
    having a throttle valve that is mechanically coupled to a drive motor, to a restoring spring and to a displacement transducer,
    having a position control circuit that controls the drive motor dependent on a difference signal D, that is dependent on an actual position value, LI, of the displacement transducer and on a rated position value, LS, that is in turn dependent on a pedal value, PW, of a generator part for a driving operation of the internal combustion engine,
    having a final control element for no-load speed that, for idling operation of the internal combustion engine, is dependent on a no-load value, LW, that a means for speed regulating provides dependent on the difference between the speed value, N, and a rated speed value, NS, for the idling speed,
    and having control means for discriminating between the driving operation and the idling operation of the internal combustion engine, comprising:
    the drive motor being a stepping motor whose field vector is controllable in rough and fine steps;
    the throttle valve also serving as the final control element for the idling operation and directly attached to a shaft of the stepping motor; and
    the rated position value, LS, for the position control circuit being dependent in the idling operation on the no-load value, LW, of the means for speed regulating.

2. The device according to claim 1, wherein the stepping motor is controlled in rough steps for a closed position control circuit and is controlled in fine steps for an open position control circuit; and wherein the transition between control in rough steps and in fine steps is dependent on the size of the difference signal, D.

3. The device according to claim 2, wherein the difference signal, D, is present in digital form having G rough places and F fine places;
    the number of rough steps to be executed is calculated in the position control circuit from the G rough places and the number of fine steps is calculated therein from the F fine places;
    the displacement transducer supplies a digital actual position value, LI, having G rough places, whereby G is selected such that the last place, the LSB place, has a value change during every rough step of the stepping motor; and
    the field vector is adjusted by a rough step by the position control circuit as a result of every such value change.

4. The device according to claim 3, wherein the displacement transducer and the stepping motor are coupled such that a spacing angle lies between the position of a rotor of the stepping motor at a value change of the LSB place of the actual position value, LI, and the neighboring lock-in position of a rough step.

5. The device according to claim 4, wherein the spacing angle is equal to half a rough step.

6. The device according to claim 5, wherein the stepping motor is fashioned as a two-phase stepping motor having a full step width of 1.8° and the size of a rough step amounts to 0.45° and the size of a fine step amounts to 0.02°.

7. The device according to claim 1, wherein the no-load value, LW, of the means for speed regulating is equal to the sum of a rated no-load value, LLS, and a regulator value, RW; and wherein the regulator value, RW, is dependent on the integral of the difference between the speed value, N, and a rated speed value, NS, for the idling operation.

8. The device according to claim 7, wherein the integral part of the regulator value, RW, is respectively set to 0 upon transition from driving operation to idling operation.

9. The device according to claim 7, wherein the last actual position value, LI, is respectively stored as rated no-load value, LLS, upon transition from idling operation to the driving operation.

10. The device according to claim 2, wherein the execution of every rough step is monitored; and wherein a rotation of the field vector is initiated for opening a sluggish throttle valve.

11. Device for controlling the intake air of an internal combustion engine, having a speed generator which outputs an engine speed value, N, representative of the speed of the internal combustion engine, having a throttle value mechanically coupled to a drive motor, a restoring spring and a displacement transducer, having a means for controlling the drive motor in response to a difference signal, D, and a rated position value, LS, the difference signal, D, representative of the difference between an actual position value, LI, of the displacement transducer and the rated position value, LS, the rated position value, LS, representative of a pedal value, PW, supplied by a generator part for a driving operation of the internal combustion engine, having a final control element for no-load speed receiving a no-load value, LW, for idling operation of the internal combustion engine, a means for speed regulating providing the no-load value, LW, in response to the difference between the engine speed value, N, and a rated speed value, NS, for the idling speed, and having a means for discriminating between the driving operation and the idling operation of the internal combustion engine, comprising:

the drive motor being a stepping motor having a field vector controllable in rough and fine steps;

the throttle value also serving as the final control element for the idling operation, the throttle value directly attached to a shaft of the stepping motor; and means for controlling receiving the rated position value, LS, representative of the no-load value, LW, for the idling operation.

12. The device according to claim 11, wherein the stepping motor is controlled in rough steps for a closed position control circuit and is controlled in fine steps for an open position control circuit; and wherein the transition between control in rough steps and in fine steps is dependent on the size of the difference signal, D.

13. The device according to claim 12, wherein the difference signal, D is present in digital form having G rough placed and F fine places;

the number of rough steps to be executed is calculated in the position control circuit from the G rough places and the number of fine steps is calculated therein from the F fine places;

the displacement transducer supplies a digital actual position value, LI, having G rough places, whereby G is selected such that the last place, the LSB place, has a value change during every rough step of the stepping motor; and the field vector is adjusted by a rough step by the position control circuit as a result of every such value change.

14. The device according to claim 13, wherein the displacement transducer and the stepping motor are coupled such that a spacing angle lies between the position of a rotor of the stepping motor at a value change of the LSB place of the acutal position value, LI, and the neighboring lock-in position of a rough step.

15. The device according to claim 14, wherein the spacing angle is equal to half a rough step.

16. The device according to claim 15, wherein the stepping motor is fashioned as a two-phase stepping motor having a full step width of 1.8° and the size of a rough step amounts to 0.45° and the size of a fine step amounts to 0.02°.

17. The device according to claim 11, wherein the no-load value, LW, of the means for speed regulating is equal to the sum of a rated no-load value, LLS, and a regulator value, RW; and wherein the regulator value, RW, is dependent on the integral of the difference between the speed value, N, and a rated speed value, NS, for the idling operation.

18. The device according to claim 17, wherein the last actual position value, LI, is respectively stored as rated no-load value, LLS, upon transition from idling operation to the driving operation.

19. The device according to claim 12, wherein the execution of every rough step is monitored; and wherein a rotation of the field vector is intitated for opening a sluggish throttle value.

* * * * *